US009925996B2

(12) United States Patent
    Crynick

(10) Patent No.: US 9,925,996 B2
(45) Date of Patent: Mar. 27, 2018

(54) TRANSPORT DOLLY FOR A SNOWMOBILE SKI

(71) Applicant: Timothy J. Crynick, Canton, MI (US)

(72) Inventor: Timothy J. Crynick, Canton, MI (US)

( * ) Notice: Subject to any disclaimer, the term of this patent is extended or adjusted under 35 U.S.C. 154(b) by 0 days.

(21) Appl. No.: 15/481,373

(22) Filed: Apr. 6, 2017

(65) Prior Publication Data

US 2017/0291622 A1    Oct. 12, 2017

Related U.S. Application Data

(60) Provisional application No. 62/319,749, filed on Apr. 7, 2016.

(51) Int. Cl.
| | |
|---|---|
| *B60P 3/00* | (2006.01) |
| *B62B 1/26* | (2006.01) |
| *B62B 1/12* | (2006.01) |
| *B62B 1/14* | (2006.01) |

(52) U.S. Cl.
CPC .............. *B62B 1/262* (2013.01); *B62B 1/125* (2013.01); *B62B 1/14* (2013.01); *B62B 2202/401* (2013.01); *B62B 2206/02* (2013.01)

(58) Field of Classification Search
CPC ..... B62B 1/00; B62B 5/00; B60P 3/00; B60P 1/48
See application file for complete search history.

(56) References Cited

U.S. PATENT DOCUMENTS

| | | | | |
|---|---|---|---|---|
| 5,716,061 A | * | 2/1998 | Sloan ........................ | B62B 1/06 254/131 |
| 2006/0245873 A1 | * | 11/2006 | Black ..................... | B60S 13/00 414/458 |

* cited by examiner

*Primary Examiner* — John D Walters
*Assistant Examiner* — James J Triggs
(74) *Attorney, Agent, or Firm* — George L. Boller

(57) ABSTRACT

Dollies support steered skis of a snowmobile on wheels to enable the snowmobile to be moved along an underlying surface with carbides on the bottom surfaces of the skis free of contact with the underlying surface.

14 Claims, 10 Drawing Sheets

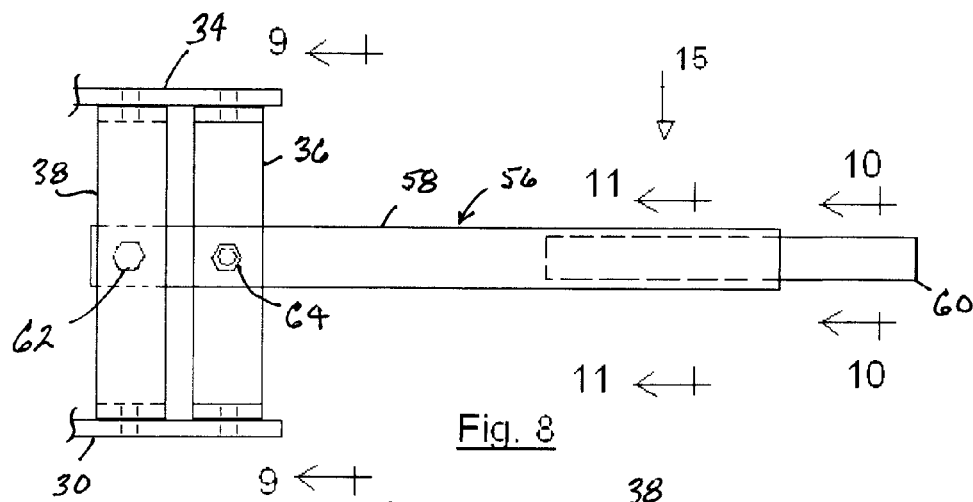
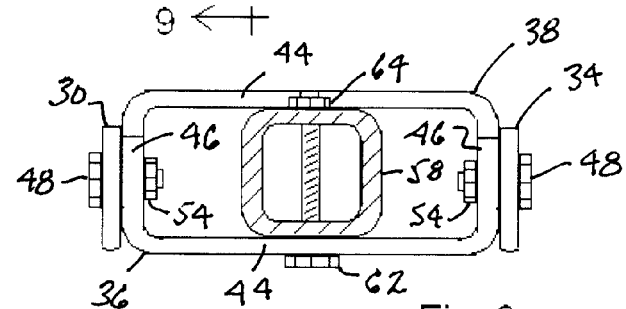
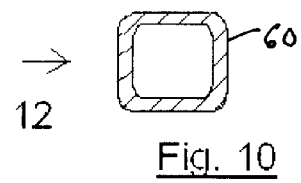
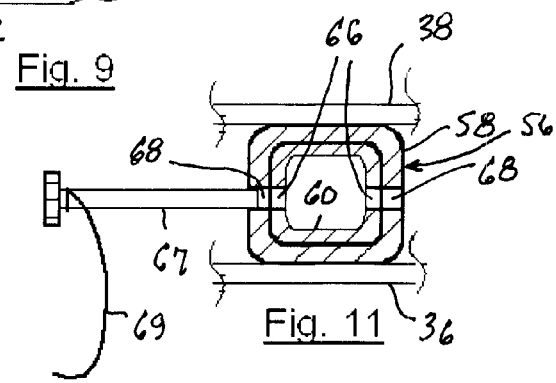
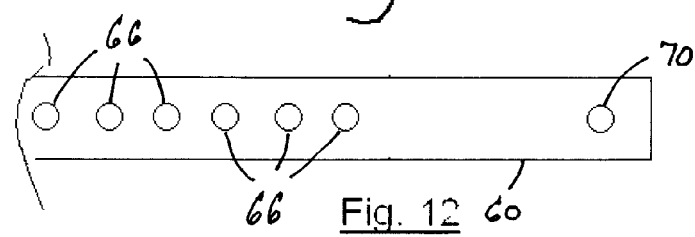

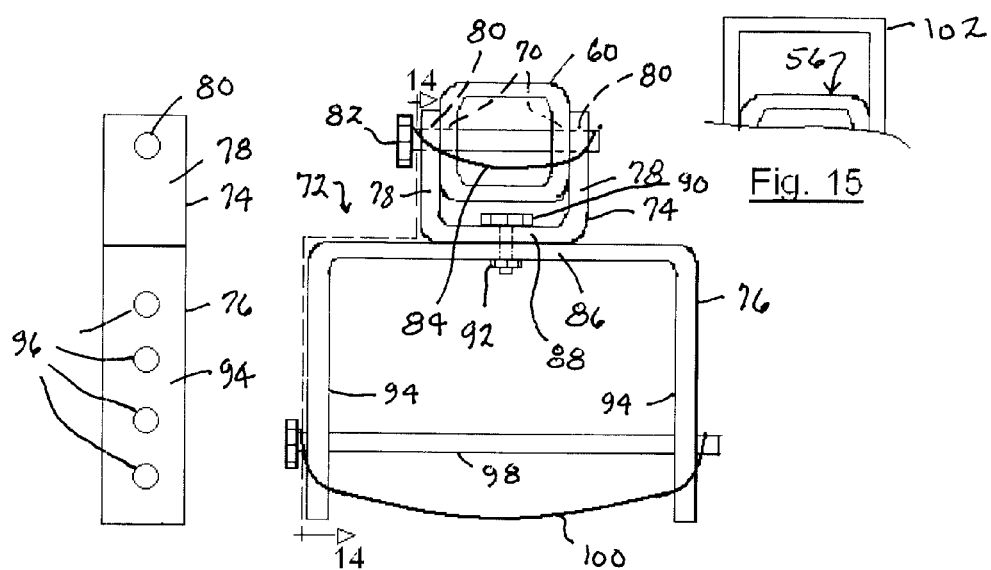
Fig. 13
Fig. 14
Fig. 15
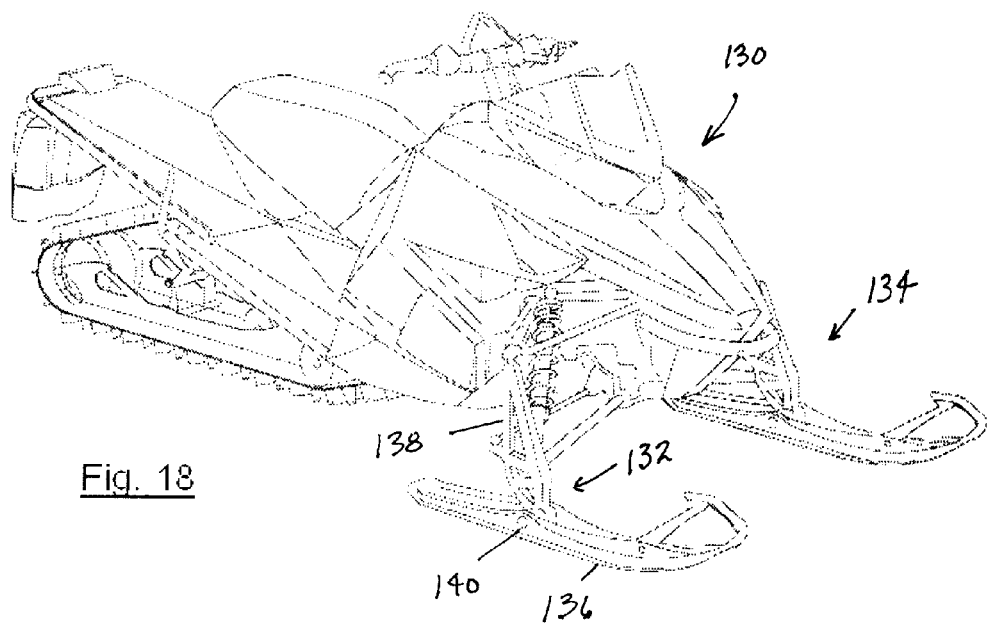
Fig. 18

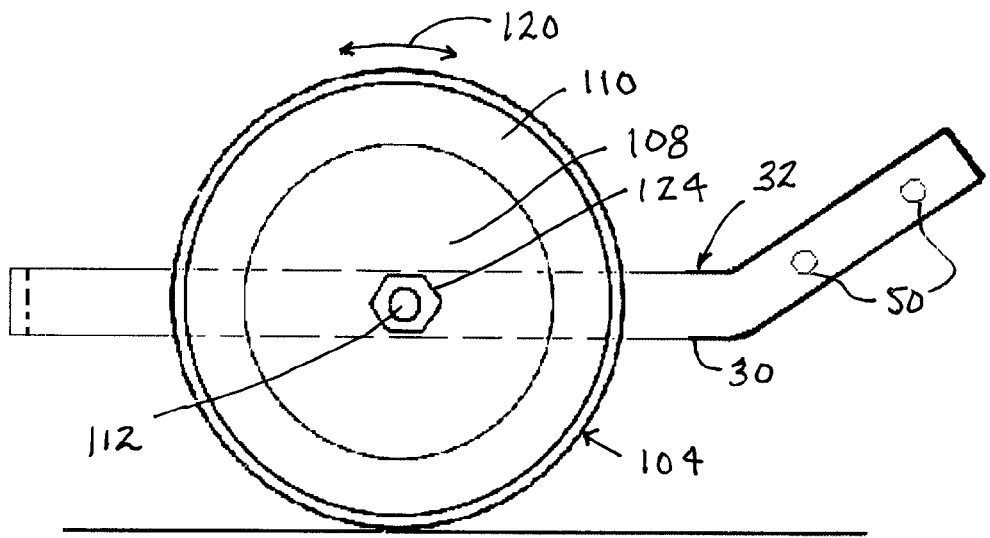
Fig. 16
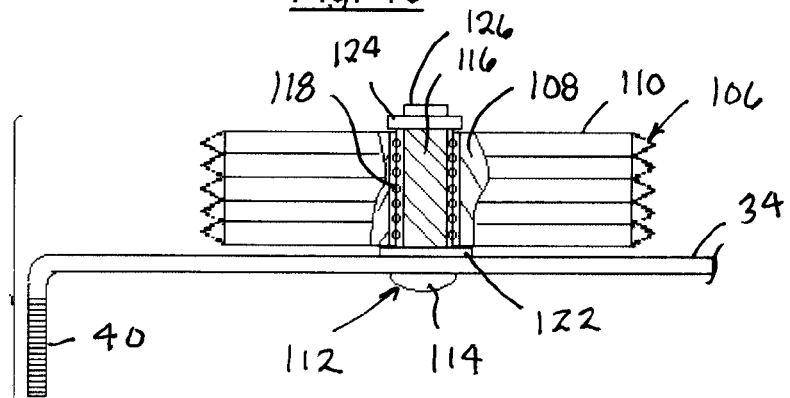
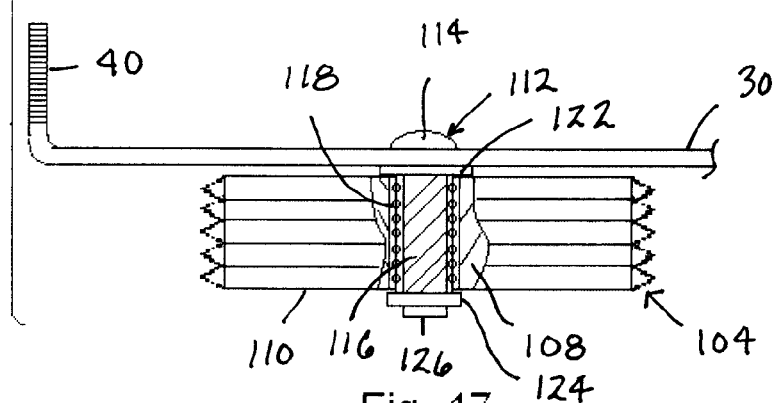
Fig. 17

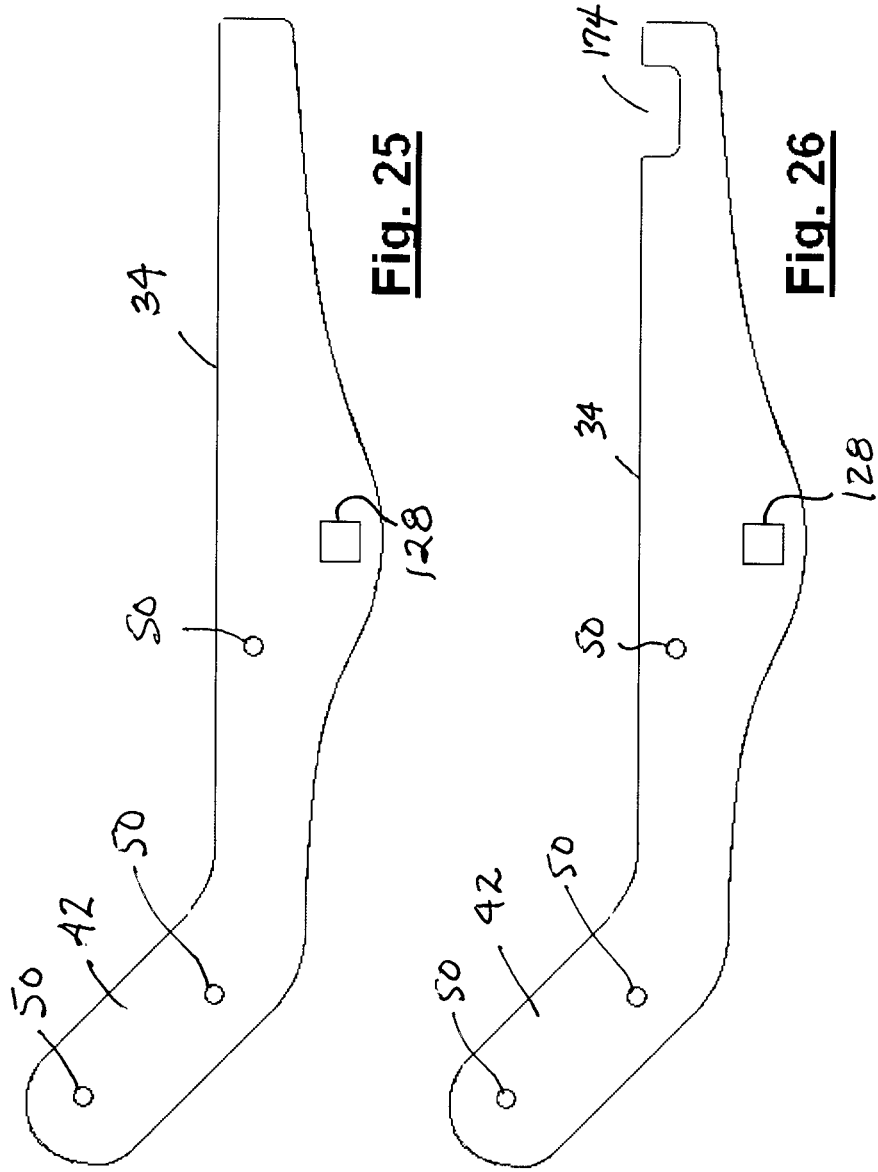

US 9,925,996 B2

TRANSPORT DOLLY FOR A SNOWMOBILE SKI

TECHNICAL FIELD

This invention relates to snowmobiles, particularly a transport dolly for supporting a snowmobile ski.

BACKGROUND OF THE INVENTION

On occasion a snowmobile must leave a groomed trail, for example when crossing snow-free terrain or snow-free road surfaces. Carbides on the bottom faces of front steering skis of a snowmobile, which are important for traction on groomed snowmobile trails, can be damaged by rubbing on hard or rough surfaces. Carbides are expensive to replace. It is known to temporarily attach wheels to snowmobile skis or deploy wheels from snowmobile skis when a snowmobile is crossing snow-free surfaces in order to avoid contact of the skis with such surfaces.

SUMMARY OF THE INVENTION

In particular the invention relates to a transport dolly on which a steered front ski of a snowmobile is supported when the snowmobile is moving on a surface which, if the ski were allowed to be in contact with the surface, could potentially damage carbides on the bottom face of the ski or impede snowmobile motion due to carbides digging into the underlying surface. Because a snowmobile typically has a right front steered ski and a left front steered ski, two dollies needed, one for each ski. The invented transport dolly is disclosed in presently preferred, but exemplary, embodiments which are hereinafter described with reference to the accompanying drawings.

BRIEF DESCRIPTION OF THE DRAWINGS

FIG. 6A is a view similar to FIG. 6 showing a modification.

FIG. 7A is a view similar to FIG. 7 showing a modification.

FIG. 8 is a top plan view of more of the first embodiment of transport dolly.

FIG. 9 is a view, partly in cross section, in the direction of arrows 9-9 in FIG. 8.

FIG. 10 is an enlarged cross section view in the direction of arrows 10-10 in FIG. 8.

FIG. 11 is an enlarged cross section view in the direction of arrows 11-11 in FIG. 8, showing additional components.

FIG. 12 is a side elevation view of a portion of one of the components in FIG. 8 as viewed in the direction of arrow 12 in FIG. 10.

FIG. 13 is a view in the same direction as FIG. 10 showing more of the first embodiment of transport dolly.

FIG. 14 is a view in the direction of arrows 14-14 in FIG. 13.

FIG. 15 is a view in the same direction as FIG. 11 showing an optional feature.

FIG. 16 is a right side view of a portion of the frame, including wheels.

FIG. 17 is a top view of a portion of FIG. 16, with portions in cross section to show mounting of the wheels.

FIG. 18 is a perspective view of a snowmobile looking from the right front.

FIG. 25 is a left side elevation view of the left side bar of the transport dolly of FIGS. 23 and 24.

FIG. 26 is a side elevation view of another embodiment of side bar.

DETAILED DESCRIPTION

Figure 1:
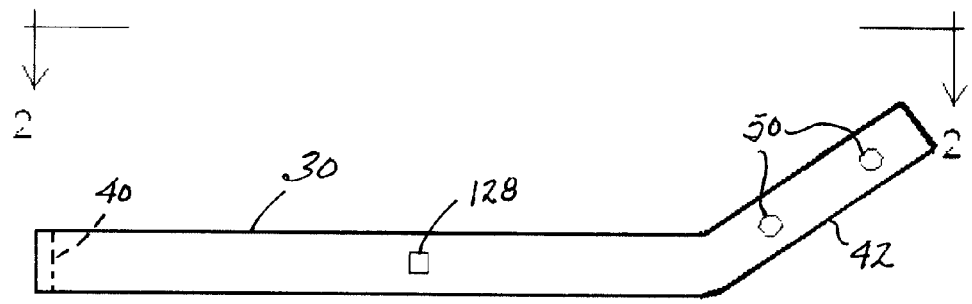
FIG. 1 is a right side elevation view of a right side bar of a first embodiment of transport dolly.
Figure 2:
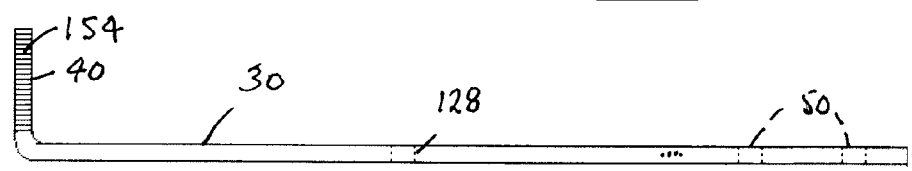
FIG. 2 is a top plan view of the right side bar in the direction of arrows 2-2 in FIG. 1.
Figure 5:
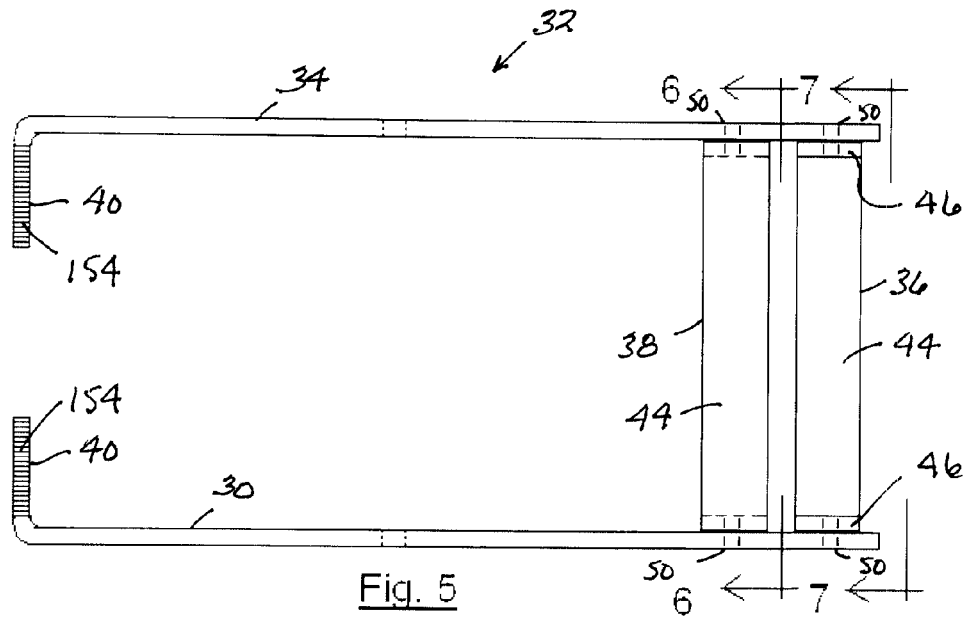
FIG. 5 is a top plan view of a frame of the first embodiment of transport dolly, including the right and left side bars and two cross bars, fasteners being omitted.

FIGS. 1 and 2 show a right side bar 30 of a frame 32 of a first embodiment of the invented dolly, the frame being shown in FIG. 5.

Figure 3:
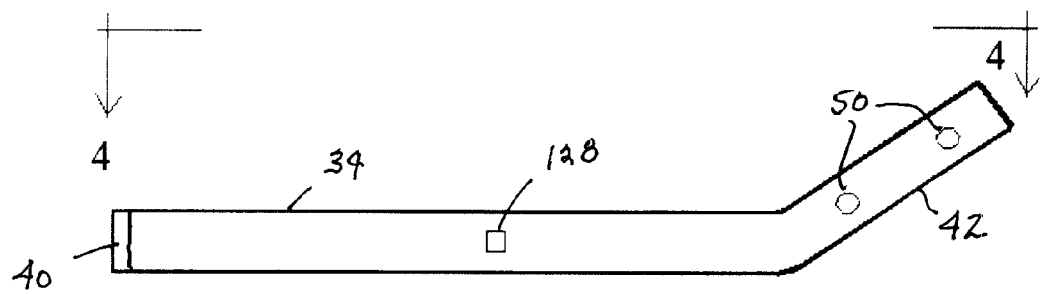
FIG. 3 is a right side elevation view of a left side bar of the first embodiment of transport dolly.
Figure 4:
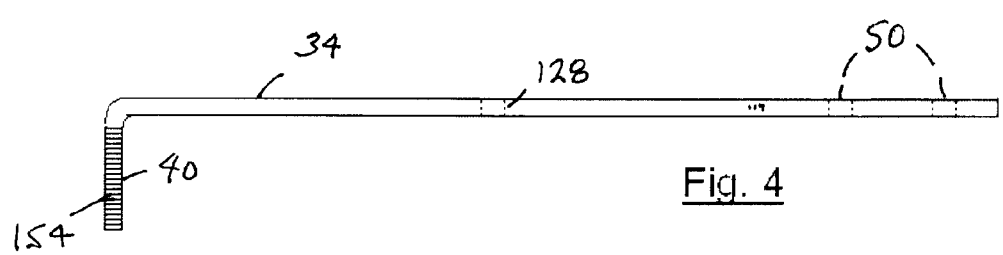
FIG. 4 is a top plan view of the left side bar in the direction of arrows 4-4 in FIG. 3.

FIGS. 3 and 4 show a left side bar 34 of frame 32.

Figure 6:
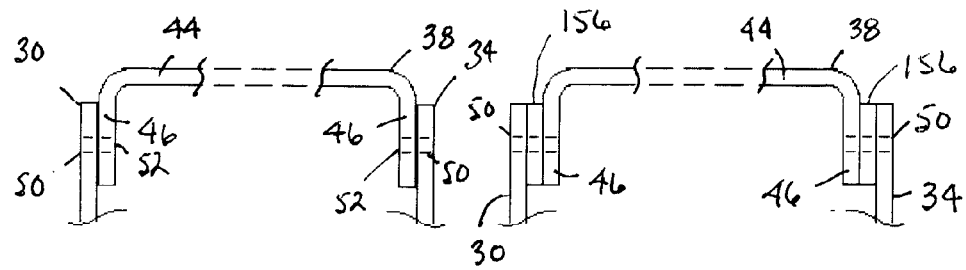
FIG. 6 is a partial view in the direction of arrows 6-6 in FIG. 5.
Figure 7:
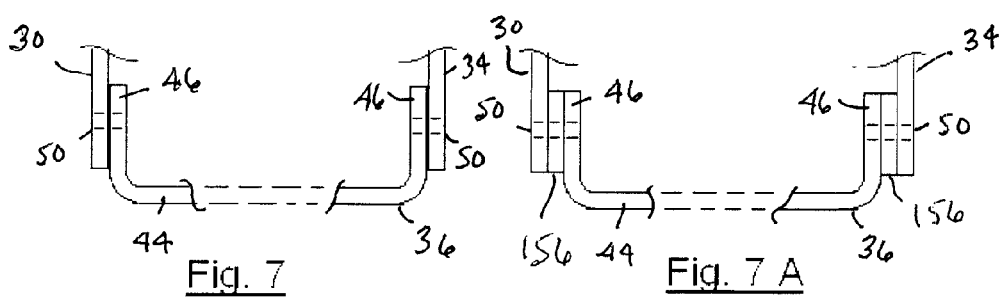
FIG. 7 is a partial view in the direction of arrows 7-7 in FIG. 5.

FIGS. 5, 6, and 7 show an upright-U cross bar 36 and an inverted-U cross bar 38 of frame 32.

Each side bar 30, 34 is fabricated from quarter inch steel and has a length extending from a rear of frame 32 to a front of frame 32. At the rear of frame 32, each side bar is bent laterally inward 90° to provide a ski-support 40. From the laterally outer end of each ski-support 40, each side bar 30, 34 extends straight for a portion of the side bar's length toward the front of frame 32, but before reaching the front, the side bar inclines to form an upward and forwardly extending dog leg 42.

Upright-U cross bar 36 and inverted-U cross bar 38 extend widthwise of frame 32 between side bars 30 and 34 and are fastened to dog legs 42, with upright-U cross bar 36 spaced slightly forward of inverted-U cross bar 38. Each cross bar is fabricated from one quarter inch thick steel to form a base 44 of the U at opposite ends of which sides 46 of the U are bent at 90° to base 44. Sides 46 of cross bar 36 are bent upward, and sides 46 of inverted-U cross bar 38 are bent downward. Fastening of sides 46 to dog legs 42 is by means of bolts 48 (FIG. 9) whose shanks pass through through-holes 50 in dog legs 42 and through through-holes 52 in sides 46 which align with through-holes 50. The bolt heads are disposed against the laterally outer faces of side bars 30, 34, and nuts 54 (FIG. 9) are threaded onto the ends of the bolt shanks which protrude from the laterally inner faces of sides 46. Nuts 54 are tightened to tension bolts 48 and keep sides 46 forced against the laterally inner faces of side bars 30, 34.

As shown in FIG. 8, the dolly further comprises a drawbar assembly 56 having a main drawbar tube 58 and a length-adjustment tube 60. FIGS. 8 and 9 collectively show that a rear portion of main drawbar tube 58 fits closely between bases 44 of cross bars 36, 38 and is fastened to each cross bar. A headed bolt 62 has a shank which passes through a through-hole in base 44 of the respective cross bar and through through-holes in main drawbar tube 58. A nut 64 is threaded onto the protruding end of each bolt shank and tightened to keep main drawbar tube 58 forcefully held against base 44 of each cross bar.

Both main drawbar tube 58 and length-adjustment tube 60 are square steel tubes, with length-adjustment tube 60 having a telescopic fit within main drawbar tube 58 (see FIG. 11) to provide overall length adjustment of drawbar assembly 56. FIG. 12 shows a series of through-holes 66 in opposite sidewalls of length-adjustment tube 60 which are spaced apart along the tube's length. FIG. 11 also shows a through-hole 68 which extends laterally through opposite vertical sidewalls of main drawbar tube 58. When length-adjustment tube 60 is positioned to align one of the aligned through-holes 66 in length-adjustment tube 60 with through-hole 68, the shank of a headed pin 67 is passed through the aligned through-holes, as suggested by FIG. 11, so that the end of the pin opposite its head protrudes from through-hole 68. One end of a lock wire 69 (also shown in FIG. 11) is retained on the shank of pin 67 next to the head and with the shank having been passed through the aligned holes, the opposite end of the lock wire is separably attached to the protruding free end of pin 67 to keep the pin from coming out of the aligned through-holes. By selecting which of the through-holes 66 in length-adjustment tube 60 is aligned with through-hole 68, overall length of drawbar assembly 56 can be set.

FIG. 12 also shows a single through-hole 70 extending through opposite sidewalls of the front of length-adjustment tube 60. Through-hole 70 provides for attachment of a sling assembly 72, shown in FIGS. 13 and 14, to the front of drawbar assembly 56. Sling assembly 72 comprises a smaller upright-U bracket 74 and a larger inverted-U bracket 76. Upright-U bracket 74 has sides 78 which fit closely to side walls of length-adjustment tube 60. Sides 78 contain aligned through-holes 80 which align with through-hole 70. The shank of a pin 82 passes through through-holes 70 and 80, and a lock wire 84 like lock wire 69 keeps the pin in place.

Inverted-U bracket 76 has a base 86 which is fastened to a base 88 of upright-U bracket 74 by a bolt 90 and a nut 92. Inverted-U bracket 76 also has sides 94 which extend downward at opposite ends of base 86. FIG. 14 shows one side 94 containing a series of through-holes 96 at intervals along the downward length of side 94. The opposite side has an identical series of through-holes in alignment with those of the one side.

FIG. 13 shows a pin 98 passed through two aligned through-holes 96 in opposite sides 94. A lock wire 100, like lock wires 69, 84, prevents pin 98 from being removed. When the lock wires 69, 84, 100 are unlocked from the respective pins, the respective pins can be removed.

FIG. 15 shows an optional handle 102 via which drawbar assembly 56 can be grasped by a person's hand. Handle 102 is fastened to drawbar assembly 56 by any means which doesn't interfere with the ability to adjust the overall length of drawbar assembly 56.

FIGS. 16 and 17 show right and left wheel assemblies 104, 106 mounted on right and left side bars 30, 34 respectively to enable frame 32 to roll on an underlying surface. Each wheel assembly comprises a wheel hub 108 on which a pneumatically inflatable tire 110 is mounted. Each wheel assembly is mounted on the respective side bar by a respective axle 112 with tire 110 of right wheel assembly 104 to the right of right side bar 32 and with tire 110 of left wheel assembly 106 to the left of left side bar 32. Each axle 112 comprises an outwardly convex head 114 and an axle shaft 116. A bearing, preferably a ball bearing assembly 118, mounts each wheel hub 108 for rotation on the respective axle shaft 116 so that each wheel assembly can rotate as suggested by arrow 120 in FIG. 16. The inner race of each bearing assembly 118 is captured axially between an inside washer 122 and an outside washer 124 through both of which axle shaft 116 passes. A nut 126 is tightened onto the outer end of the respective axle shaft to hold the inner race of each bearing assembly 118 fast on the respective side bar between washers 122, 124 while bearing assembly 118 allows the respective wheel hub 108 and tire 110 to rotate free of contact with the respective side bar due to the intervening washer 122. FIGS. 1 and 3 show that each side bar has a square through-hole 128, and it is through the respective through-hole 128 that the respective axle 112 passes. Adjacent head 114 each axle 112 has a square shape which fits to square through-hole 128 to prevent the axle from turning within the square through-hole.

Figure 19:
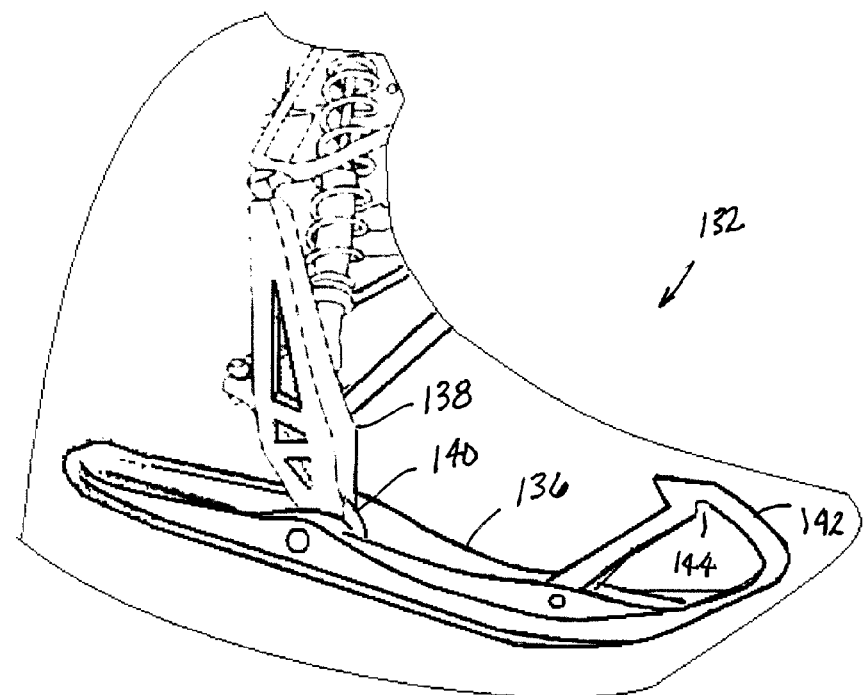
FIG. 19 is an enlarged view of a portion of the snowmobile shown in FIG. 18 including a right steering ski.
Figure 20:
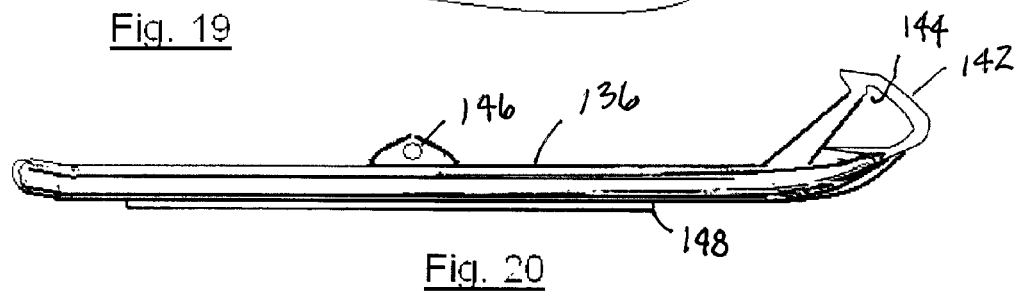
FIG. 20 is a right side elevation view of the right steering ski by itself.

FIG. 18 shows an example of a snowmobile 130 which has right and left front steering ski assemblies 132, 134. An enlarged view of right ski assembly 132 is shown in FIG. 19. The ski assemblies comprise several parts, two of which are the ski 136 itself and a spindle 138. Near the center of the ski's length is a pivot joint 140 via which the ski connects to the lower end of spindle 138. The pivot joint allows the ski to turn about a generally horizontal axis which is generally transverse to the length of the ski. Ski 136 is shown by itself in FIG. 20. At the front of ski 136 is a handle 142 via which the ski can be grasped by a person's hand to lift the front of the ski. The particular shape of the handle shown is that of a popular snowmobile brand. Handle 142 has a distinctive notch 144 on its inner surface, as shown. The portion of pivot joint 140 which is contained in ski 136 is indicated by the numeral 146.

Figure 21:
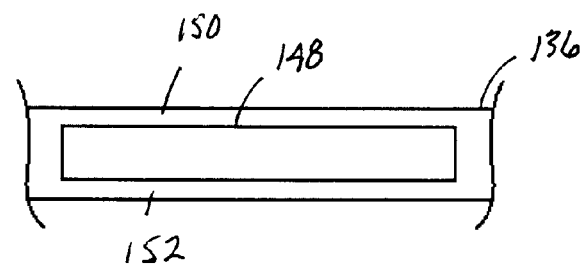
FIG. 21 is a bottom view of a portion of the right steering ski.

The bottom of ski 136 as shown in FIG. 21 contains what are commonly known as carbides. They endow the ski with a capability for steering the snowmobile on snow, a capability which is not provided by the material from which the ski itself is fabricated. Carbides can be damaged when a ski travels on a non-snow-covered surface, such as concrete or asphalt, and their gripping capability may even prevent a ski from sliding on a non-snow-covered surface.

FIG. 21 illustrates an example of a carbide zone 148 on the bottom of a ski within which carbides are located. Carbide zone 148 is located laterally inward of sides of the ski over a limited length of the ski. That leaves side margins 150, 152 of the ski bottom free of carbides. When the ski is on a flat underlying surface, it is the carbides which are disposed on that flat underlying surface. Because carbides have thickness, typically at least one-half inch to as much as one inch, side margins 150, 152 of the ski are spaced above the underlying surface. The representation of carbide zone 148 as a rectangle should not be construed to imply that the carbides actually have that shape. Typical carbides are bars which are fastened to the ski within a zone such as zone 148 and can be removed and replaced.

Figure 22:
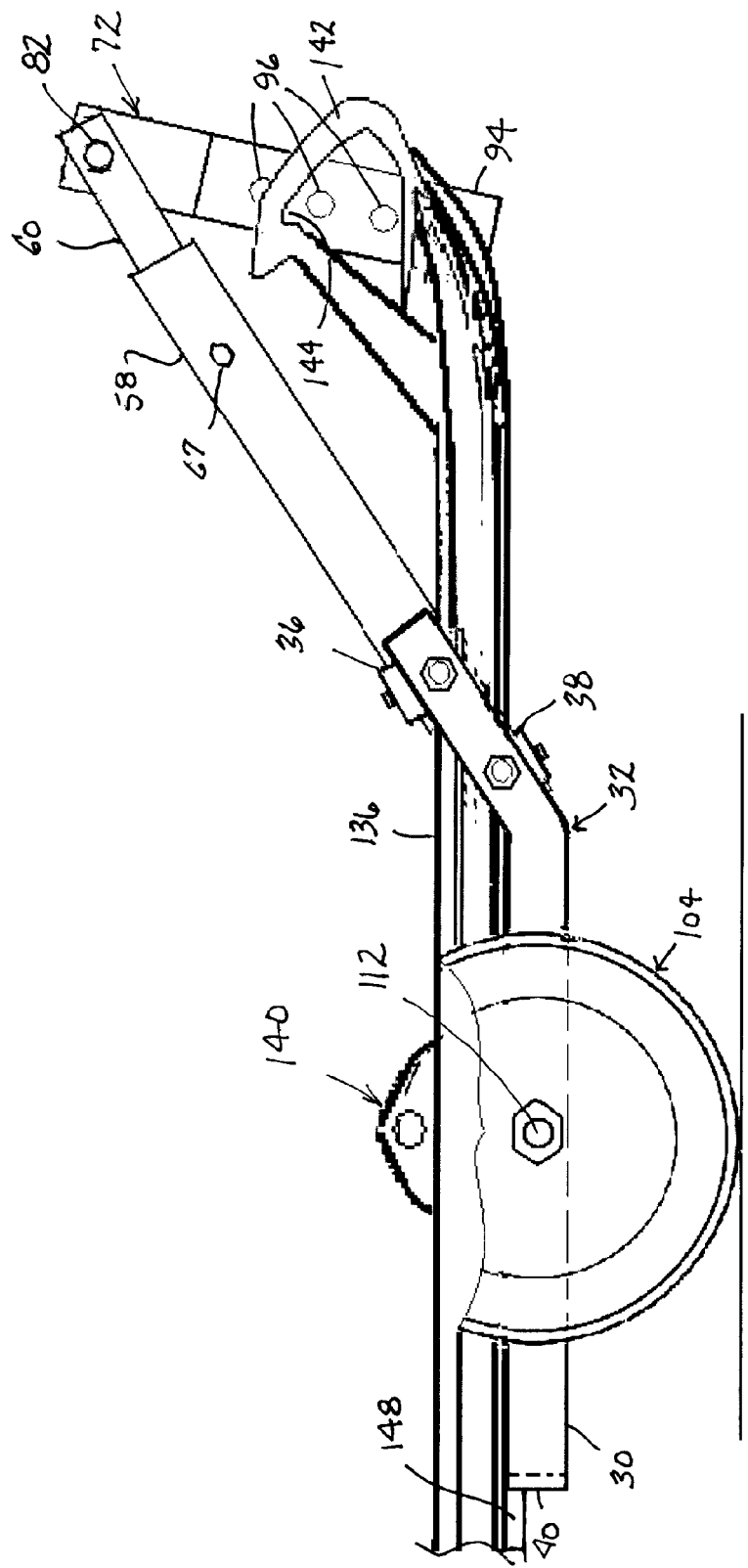
FIG. 22 is a right side elevation view illustrating how the transport dolly is used with the right steering ski.

Use of the invented dolly with reference to right ski assembly 132 is explained with reference to FIG. 22 which shows ski 136 of right ski assembly 132 supported on frame 32 and pivot joint 140 located directly vertically above axle 112. Ski 136 of left ski assembly 134 would be similarly placed on its dolly. The lateral distance between the right and left side bars 30, 34 is set by the identical overall lengths of cross bars 36, 38 so that the distance between the side bars is slightly greater than the width of the ski. Each ski-support 40 extends inward so that it can provide underlying support of a respective side margin of the ski. Ski-supports 140 extend inward the same distance to leave their inner ends spaced apart a distance which is greater than the width of carbide zone 148.

In order to associate frame 32 with ski 136 so that the dolly can support the ski when the snowmobile is being moved, a person uses drawbar assembly 56 to place the dolly in a position which locates each side bar 30, 34 to the outside of a respective side of the ski with ski-supports 40 extending inward to underlie the ski forwardly of pivot joint 140. Side bars 30 and 34 are sufficiently inclined from horizontal that the straight portions of the side bars are vertical, or almost vertical with dog legs 42 pointing in an upward and rearward direction. That orientation allows ski-supports 40 to be moved through the vertical clearance between margins 150, 152 and the underlying surface on which carbides 148 are resting without obstruction. The person then uses drawbar assembly 56 to roll the dolly rearward, and may swing drawbar assembly 56 a limited extent in the clockwise direction as viewed in FIG. 22. The dolly is rolled to a final position at which axles 112 directly underlie pivot joint 140. At that position, the person swings drawbar assembly 56 further clockwise to cause ski-supports 40 to come into contact with margins 150, 152 of the bottom surface of the ski at a location rearward of pivot joint 140. Continued clockwise swinging of drawbar assembly 56 causes ski-supports 40 to begin lifting ski 136 at locations rearward of pivot joint 140 and at the same time causing the front of the ski to begin to swing downward. As drawbar assembly 56 is swung further clockwise, sling assembly 72 comes to a position where some of through-holes 96 come into registration with the open area of handle 142. The ski however is not yet fully constrained on the dolly. Next, the person passes pin 98 through the twp aligned through-holes 96 of sling assembly 72 which are below and closest to notch 144 after which the person locks lock wire 100 to pin 98 to prevent the pin from being removed. Pin 98 thereby captures the front of the ski in sling assembly 72 to constrain the ski on the dolly. When the person releases drawbar assembly 56, weight of the snowmobile acting through ski assembly 132 on ski-supports 40 causes the ski and frame 32 to begin swinging counterclockwise and pin 98 to fit into notch 144. The weight being applied to ski-supports 40 causes the dolly to continue swinging counterclockwise and in the process, pin 98 to lift the front of the ski counterclockwise until stability is achieved with the ski and frame 32 being out of contact with the underlying surface on which tires 110 are resting. The ski is thereby supported at both front and rear and its carbides in zone 148 will be spaced above the underlying surface. When the opposite ski is supported by another dolly in like manner, the front of the snowmobile can roll on the wheels of the two dollies. FIG. 22 shows ski-supports 40 supporting the ski contact with margins 150, 152 and not a carbide in zone 148.

FIGS. 2, 4, and 5 show that the top surfaces of ski-supports 40 have features 154 which, once a ski is supported on a dolly, grip margins 150, 152 to resist sliding of the ski on the ski-supports. Such features may be provided by shallow grooves which are parallel to the ski's length and separated by pointed ridges on which margins 150, 152 rest.

Frame 32, as shown in FIGS. 5, 6, and 7, has the following dimensions: overall width between laterally outer surfaces of side bars 30, 34=8.0 inches; length of each ski-support 40 measured from laterally outer surface of each side bar 30, 34=2.25 inches, leaving distance between inner ends of ski-supports 40=3.5 inches; length of main drawbar tube 58=13.0 inches; length of length adjustment tube 60=8.0 inches; length of each dog leg 42=4.5 inches; length of each side bar between dog leg and rear surface of ski-support=13.0 inches; distance from rear surface of ski-support to center of through-hole 128=7.0 inches; length of sides 94=4.0 inches.

The overall width of frame 32 can be increased to 8.5 inches by placing quarter-inch thick spacers 156 between ends of cross bars 36, 38 and side bars 30, 34, as shown in FIGS. 6A and 7A, before the cross bars and side bars are assembled to each other.

The steel parts 30, 34, 36, 38, 58, 60, 74, 76, 102, 156 can be finished with a protective and colorized decorative coat using powder-coating methods.

Figure 23:
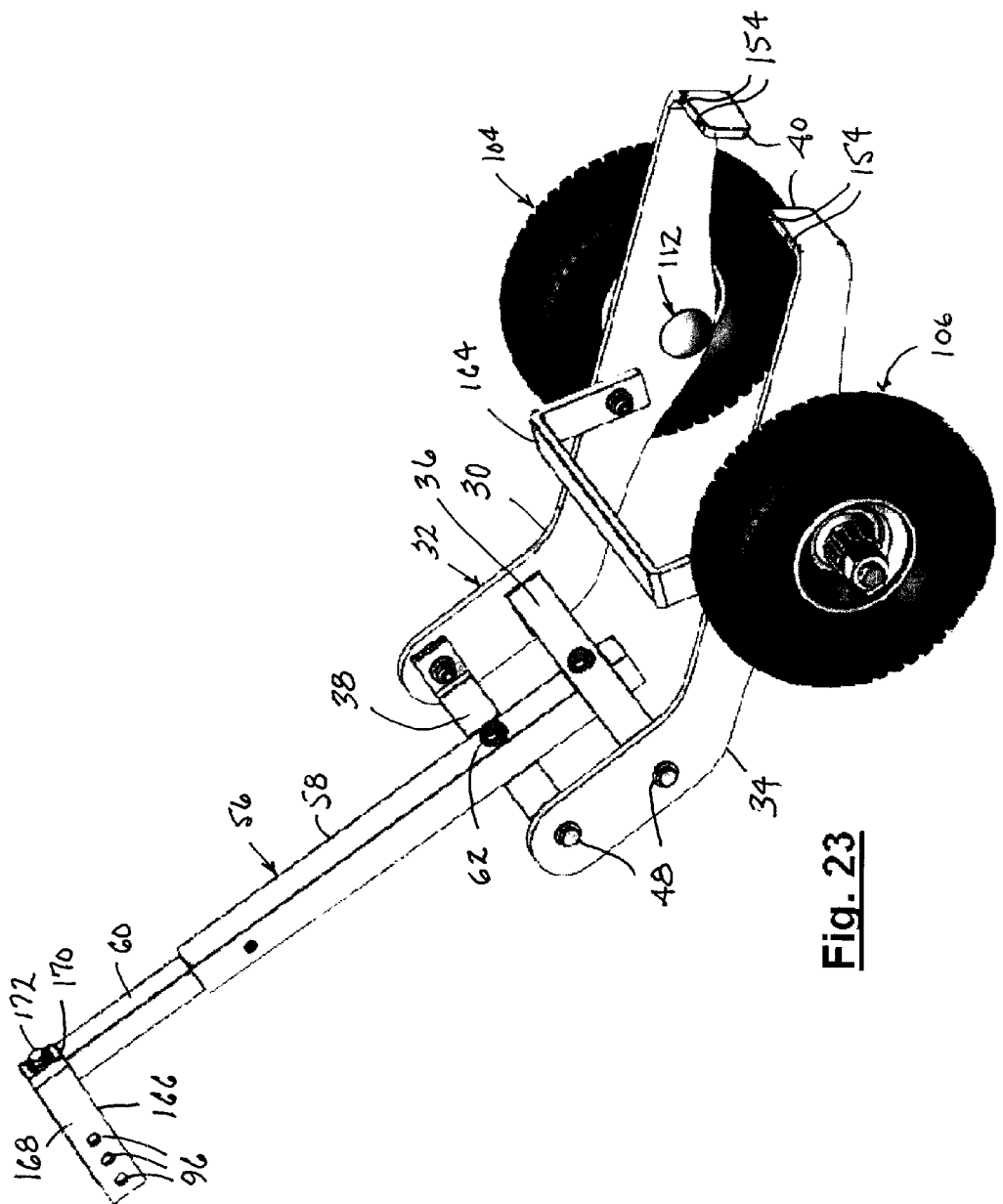
FIG. 23 is a perspective view of a modified embodiment of transport dolly.
Figure 24:
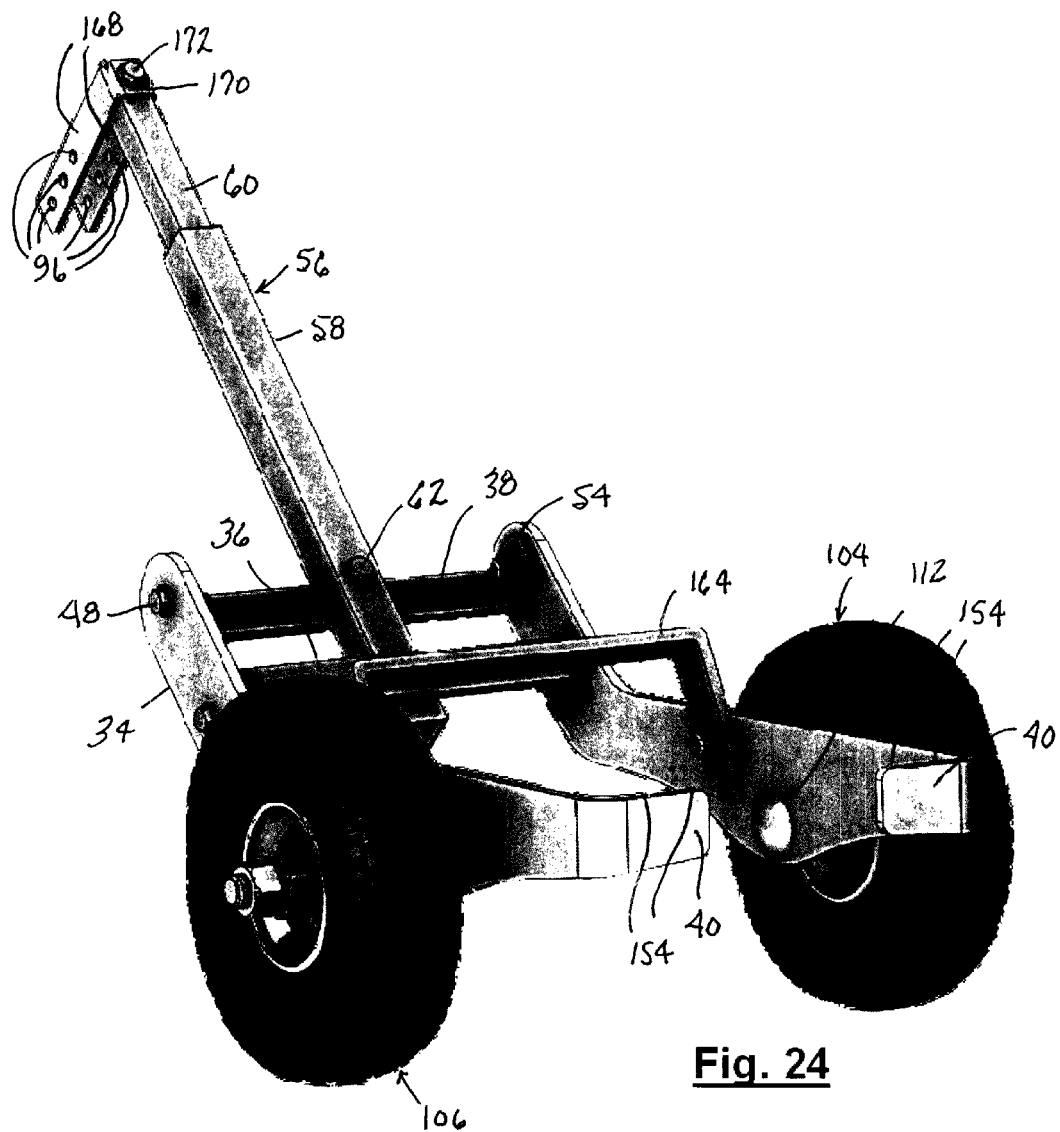
FIG. 24 is a perspective view of the modified embodiment of transport dolly looking in a different direction.

FIGS. 23 and 24 show a second embodiment of the invented dolly with corresponding parts being identified by the same reference numerals previously used. The second embodiment differs from the first in the following respects.

Side bars 30 and 34 have a slightly different shape as shown by the left side view of left side bar 34 of FIG. 25 in which the end of dog leg 42 is rounded and on both sides of square hole 128, the vertical dimension gradually increases from a constant vertical dimension toward square hole 128 until reaching a location vertically below the midpoint of square hole 128. This allows square hole 128 to be vertically lower in the second embodiment than in the first so that for a given diameter of tire 110, the top edges of side bars 30 and 34 are higher off the underlying surface on which the tires rest. The height of the top edges of side bars 30 and 34 off the ground is determined by the particular snowmobile model on which the dolly is to be used.

Another difference between the second embodiment and the first is that instead of having pointed ridges on which margins 150, 152 rest, the features 154 on each ski-support 40 are two carbide spikes which are located on the top surface of each ski-support 40 at locations so that when the dolly is supporting a ski, the carbide-free side margins 150, 152 of the bottom surface of the ski will rest on the ski-supports through the carbide spikes. A carbide spike has a conical pointed and a shank which extends downward. The shank is press-fit in a hole in the ski-support and also is preferably glued in place.

Another difference is that each side bar in the second embodiment has a third hole 50 located as shown between dog leg 42 and square hole 128. These third holes are used for fastening a third U-shaped cross bar 164 to side bars 30 and 34 as shown in FIGS. 23 and 24. U-shaped cross bar 164 has an inverted-U shape, and is incorporated to provide additional rigidity to frame 32 when needed. It should also be noticed that the locations of upright-U cross bar 36 and inverted-U cross bar 38 are reversed from their locations in the first embodiment.

The second embodiment has a simplified sling comprising a single inverted-U bracket 166 having sides 168 which extend downward at opposite ends of a base 170. Base 170 is disposed against the top surface of drawbar length adjustment tube 60 and the two are fastened together by a nut and bolt fastener 172. Each side 168 contains a series of through-holes 96 as in the first embodiment.

FIG. 26 shows another side bar which is like the one shown in FIG. 25 except for certain differences in dimensions and/or shapes. The top margin contains a notch 174 to accommodate a particular model of ski. Differences between the various parts and embodiments which have been disclosed illustrate that generic principles of the invention can be embodied in transport dollies for use with various snowmobile models and snowmobile ski models.

What is claimed is:

1. A transport dolly for supporting a steered front ski of a snowmobile, the transport dolly comprising:
a frame having a length extending between a front of the frame and a rear of the frame and a width extending between right and left sides of the frame which comprise right and left side bars extending from the front of the frame to the rear of the frame, a right ski-support extending widthwise from the right side bar at the rear of the frame toward the left side bar, a left ski-support extending widthwise from the left side bar at the rear of the frame toward the right side bar, the ski-supports providing support for a rear of a ski, each side bar having a front segment of its length at an acute angle extending upward toward the front from a rear segment which extends rearward of the front segment, wheels for rolling the frame on an underlying surface, the wheels comprising a right wheel disposed to the right of, and mounted on, the rear segment of the right side bar, and a left wheel disposed to the left of, and mounted on, the rear segment of the left side bar, a drawbar fastened to the frame at a location between the right side bar and the left side bar and extending upward at an acute angle from the front of the frame, and a sling mounted on the drawbar at a location spaced from the front of the frame for supporting a front of a ski.

2. A transport dolly as claimed in claim 1 further comprising at least one cross bar extending widthwise of the frame between, and joined, to the right side bar and the left side bar.

3. A transport dolly as claimed in claim 2 in which the at least one cross bar has a U shape comprising a base and sides at opposite ends of the base which are respectively fastened to the right side bar and the left side bar.

4. A transport dolly as claimed in claim 3 in which the at least one cross bar has an inverted-U shape.

5. A transport dolly as claimed in claim 3 in which the at least one cross bar has an upright-U shape.

6. A transport dolly as claimed in claim 5 in which the at least one cross bar further comprises an additional cross bar having a base and sides fowling an inverted-U shape, the respective cross bars being and spaced from each other along length of the side bars.

7. A transport dolly as claimed in claim 6 in which the sides of the cross bars are fastened to the front segments of the side bars.

8. A transport dolly as claimed in claim 7 in which the drawbar is disposed centrally of the width of the frame and is fastened to the bases of both cross bars.

9. A transport dolly as claimed in claim 8 in which the drawbar comprises an outer tube which is fastened to the bases of both cross bars and an inner tube which can telescope within the outer tube to set overall length of the drawbar, the sling being fastened to the inner tube at a location beyond the outer tube.

10. A transport dolly as claimed in claim 9 in which the sling comprises a base mounted on the inner tube and sides which depend from opposite ends of the base, each side containing multiple through-holes each of which aligns with a through-hole in the opposite side of the sling, and a pin which extends through aligned through-holes in the sides of the sling for slinging a handle of a ski from the inner tube.

11. A transport dolly as claimed in claim 1 in which each ski-support is bent at an angle from its side bar.

12. A transport dolly as claimed in claim 11 in which each ski-support is bent at a right angle from its side bar.

13. A transport dolly as claimed in claim 1 in which each ski-support comprises a feature for gripping a carbide-free margin of a bottom surface of a ski.

14. A transport dolly as claimed in claim 13 in which the feature for gripping a carbide-free margin of a bottom surface of a ski comprises a carbide spike.

* * * * *